United States Patent
Wei et al.

(10) Patent No.: US 7,719,732 B2
(45) Date of Patent: May 18, 2010

(54) LIGHT SENSING ELEMENT HAVING TWO FUNCTIONS

(75) Inventors: Chih-Hsien Wei, Taipei (TW); Ming-Sheng Yang, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 1321 days.

(21) Appl. No.: 11/197,407

(22) Filed: Aug. 5, 2005

(65) Prior Publication Data

US 2006/0132861 A1 Jun. 22, 2006

(30) Foreign Application Priority Data

Dec. 22, 2004 (TW) .............................. 93140045 A

(51) Int. Cl.
- *H04N 1/46* (2006.01)
- *H04N 1/04* (2006.01)
- *H01L 27/00* (2006.01)
- *G01N 21/86* (2006.01)

(52) U.S. Cl. .................... 358/514; 358/474; 250/208.1; 250/559.4; 250/559.3

(58) Field of Classification Search .............. 358/901.1, 358/518, 1.9; 348/272, E5.028, 315; 250/208.1, 250/559.4, 559.3
See application file for complete search history.

(56) References Cited

U.S. PATENT DOCUMENTS

| | | | | |
|---|---|---|---|---|
| 4,871,228 | A * | 10/1989 | Roos | 358/901.1 |
| 4,941,039 | A * | 7/1990 | E'Errico | 358/518 |
| 5,061,036 | A * | 10/1991 | Gordon | 348/272 |
| 6,836,345 | B1 * | 12/2004 | Setchell | 358/1.9 |
| 7,297,931 | B2 * | 11/2007 | Krantz et al. | 348/E5.028 |
| 7,515,189 | B2 * | 4/2009 | Slagle | 348/315 |
| 2004/0178329 | A1 * | 9/2004 | Kare et al. | 250/227.11 |
| 2005/0117043 | A1 * | 6/2005 | Fujii et al. | 348/311 |
| 2005/0180300 | A1 * | 8/2005 | Meyrueis et al. | 369/125 |

FOREIGN PATENT DOCUMENTS

TW 577226 2/2009

* cited by examiner

*Primary Examiner*—King Y Poon
*Assistant Examiner*—Akwasi M Sarpong
(74) *Attorney, Agent, or Firm*—Rabin & Berdo, P.C.

(57) ABSTRACT

A light sensing element having two functions is provided for a high-speed image scanning system to scan a document, including a set of matrix light-sensing cells for detecting a scanning location for the scanned document, thereby feeding the sensed signals to control the scanning location and scanning speed, and at least one set of trilinear light-sensing cells for sensing an document, thereby acquiring image signals.

10 Claims, 6 Drawing Sheets

LIGHT SENSING ELEMENT HAVING TWO FUNCTIONS

BACKGROUND

1. Field of Invention

The invention relates to a light sensing element having two functions and, in particular, to a light sensing element having the two functions of signal control and image capture.

2. Related Art

With the progress in technologies, software and hardware techniques in image scanning devices have great advance. Currently, most image scanning devices have certain scanning quality (i.e. sufficient resolution), which have satisfied the needs of most people and even some professional people. Therefore, the development of image scanning devices will focus on the increasing in image scanning speed and miniaturization of the image scanning system in the future.

When a document (i.e. the original physical object, such as photo or text document) is scanned, a highpower light source is used to generate a strong light beam to illuminate the document to be scanned. Then an encoder obtains a sensed signal by detecting the light beam in present scanned position. The sensed signal is converted by an analog-to-digital converter (ADC) and then is inputted into an application specific processing unit. The application specific processing unit compiles and processes the received signal, and the sensed information is stored in a block of memory. The light sensing element extracts the analog image signal of the scanned document, and outputs a set of analog signals composed of red (R), green (G), and blue (B) color signals. The ADC converts the received analog signal into a digital signal, and then the digital signal is input into the application specific processing unit. After the application specific processing unit processes the digital signal, the processed digital signal is stored in the memory. At an appropriate time, the final image signal is inputted into a processing terminal via an interface converter for other subsequent image processing jobs. In particular, a stepping motor drives a light source or the light sensing element, so that the light sensing element scans the document with a scan line to obtain a document image signal or an image signal. Moreover, the stepping motor performs positioning and adjusts rotation speed thereof based on the sensing information, thereby obtaining better sensing state and speed.

To enhance the scanning quality, a charge-coupled-device (CCD) sensing apparatus with two sensing elements is disclosed in R.O.C. Pat. No. 577226. A first CCD shift buffer having several first CCD elements and several second CCD elements, a first light sensing element set with several first light sensing elements, and a second light sensing element set with several second light sensing elements are disclosed in the patent. The first and second light sensing element sets detect the same light signal and generate respectively first and second signal charges. The charges are received by interleaving first CCD element and second CCD element which are interlaced with each other, thereby achieving high resolution scanning.

However, in this processing mode, the scanning quality of the current image scanning device has satisfied the needs of most users. Hence, how to further improve the conventional image scanning system to achieve a higher scanning speed and/or to minimize the size of the image scanning device, without sacrificing the already satisfactory scanning quality, will be the most important directions in further development of the image scanning device.

SUMMARY

In view of the foregoing, the present invention is to provide a light sensing element having two functions, which is applied to a high-speed image scanning system, thereby solving problems existing in the prior art.

According to the invention, the light sensing element with two functions applied to a high-speed image scanning system is to save the cost of the device.

According to the invention, the light sensing element with two functions applied to a high-speed image scanning system is to increase the scanning speed.

The disclosed light sensing element with two functions for an image scanning device to scan a document includes: a set of matrix light-sensing cells, at least one set of trilinear light-sensing cells, a sensed signal processing unit, at least one color signal processing unit, several buffers, and a synchronization processing unit.

The set of matrix light-sensing cells has several light-sensing cells arranged in a matrix to detect a scanning location for the scanned document, and output the sensed data representing the scanning location. Each set of trilinear light-sensing cells has several light-sensing cells arranged in a linear array to detect a sensed region of the scanned document, and outputs the image data corresponding to the sensed region. The sensed signal processing unit is coupled to the set of light-sensing cells to process the sensed data and output the corresponding sensed signals, which are in a binary code form. Each color signal processing unit is coupled to the set of trilinear light-sensing cells to process the image data outputted by the corresponding set of trilinear light-sensing cells, and to output the image signals corresponding to the image data. The image signals include red, green, and blue color signals. Each of the buffers is installed with each of the sensed signal processing unit and the color signal processing unit, and stores either the sensed signals, outputted from the corresponding sensed signal processing unit, or the image signals, outputted from each color signal processing unit. Finally, the synchronization processing unit coupled to the buffers receives the sensed signals and the image signals from the buffers, and then synchronizes the sensed signals and the image signals before output. In particular, the image scanning device adjusts the scanning location, where the image data are acquired, based on the sensed signals.

The light-sensing cells in the set of matrix light-sensing cells are arranged in an m-by-n matrix, where m and n are integers greater than 1. Moreover, the width of each light-sensing cell in the set of matrix light-sensing cells can be increased to speed up the speed of finding the scanning location.

The set of trilinear light-sensing cells has three linear arrays of the light-sensing cells, each of which corresponds to a color signal.

The set of matrix light-sensing cells and the set of trilinear light-sensing cells are formed by dividing the light-sensing cells in a contact image sensor (CIS), a CCD, or a complementary metal oxide semiconductor (CMOS) image sensor into several sets.

According to the principle of the invention, the disclosed light sensing element has simultaneously the two functions of signal controls and image captures, to feedback control the scanning location and scanning speed. Furthermore, the disclosed light sensing element can collaterally execute the image captures, thereby increasing the image processing speed. Therefore, the disclosed light sensing element with two functions can have the advantage of accelerating the scanning speed.

BRIEF DESCRIPTION OF THE DRAWINGS

The accompanying drawings, which are included to provide a further understanding of the invention and are incorporated in and constitute a part of this specification, illustrate embodiments of the invention and together with the description for serving to explain the principles of the invention, in which.

DETAILED DESCRIPTION OF THE INVENTION

The invention is a light sensing element having two functions. It is mainly used in image scanning devices, such as scanners, multiple function printers and so on, so that the image scanning devices can complete a document scanning at a high speed for other processing terminals (e.g. personal computers (PC)).

Figure 1:
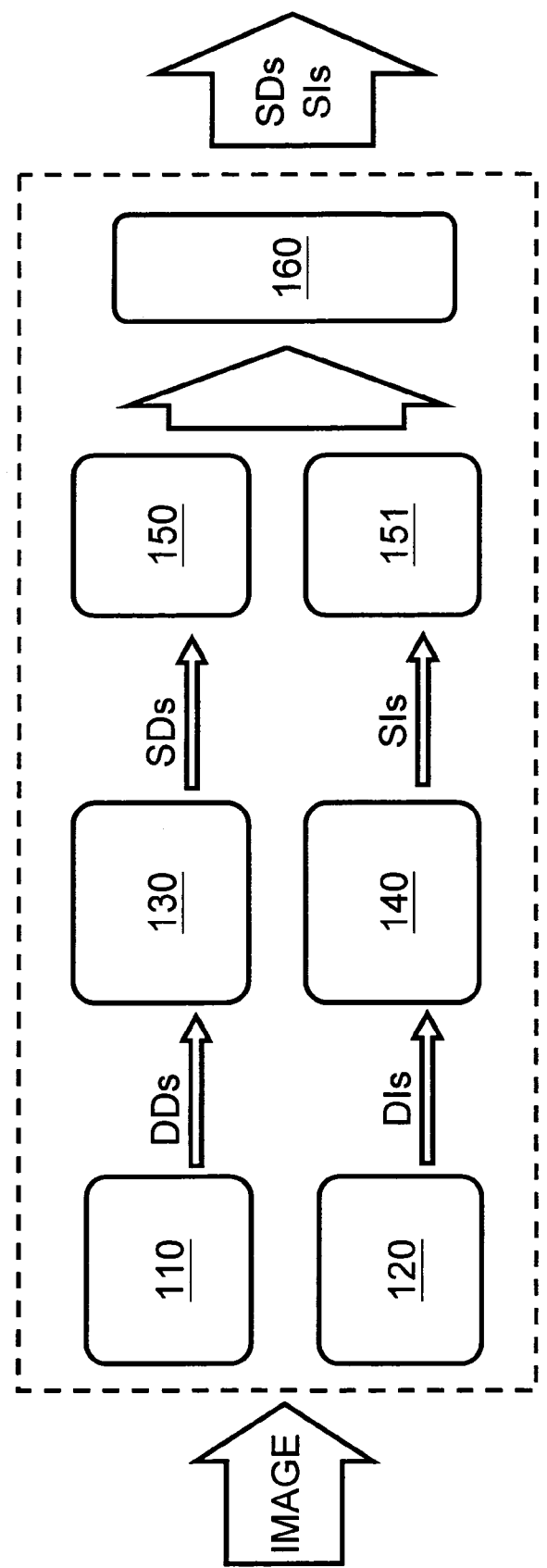
FIG. 1 is a schematic structural diagram of the light sensing element with two functions according to an embodiment of the invention.

With reference to FIG. 1, an embodiment of the disclosed light sensing element with two functions includes: a set of matrix light-sensing cells 110 having several light-sensing cells arranged in a matrix to detect the scanning location for a scanned document and to output the detected data DDs representing the scanning location detected; a set of trilinear light-sensing cells 120 having several light-sensing cells arranged in a linear array to detect a sensing region for the scanned document IMAGE and to output the image data DIs; a sensed signal processing unit 130 installed corresponding to the set of matrix light-sensing cells 110 for processing the sensed data DDs and outputting the corresponding sensed signals SDs; a color signal processing unit 140 installed corresponding to the set of trilinear light-sensing cells 120 for processing image data DIs and outputting the corresponding image signals SIs; two buffers (i.e. first and second buffers 150, 151) installed respectively corresponding to the sensed signal processing unit 130 and the color signal processing unit 140, and for storing respectively the sensed signals SDs and image signals SIs from them; and a synchronization processing unit 160 coupled to the first and second buffers 150, 151 for receiving the sensed signals SDs and image signals SIs from the first and second buffers 150, 151, and for synchronizing the sensed signals SDs and image signals SIs to output into the subsequent processing system. In particular, the scanning location for obtaining the image data DIs is adjusted according to the sensed signals SDs. That is, the sensed signals SDs are the base of adjusting the scanning speed and the scanning location, thereby obtaining in sequence the image signals DIs in all the sensing regions for the scanned document IMAGE. Moreover, the sensed signals SDs are in a binary code form. The image signals DIs include red, green, and blue color signals representing red, green, and blue colors respectively.

Figure 2:
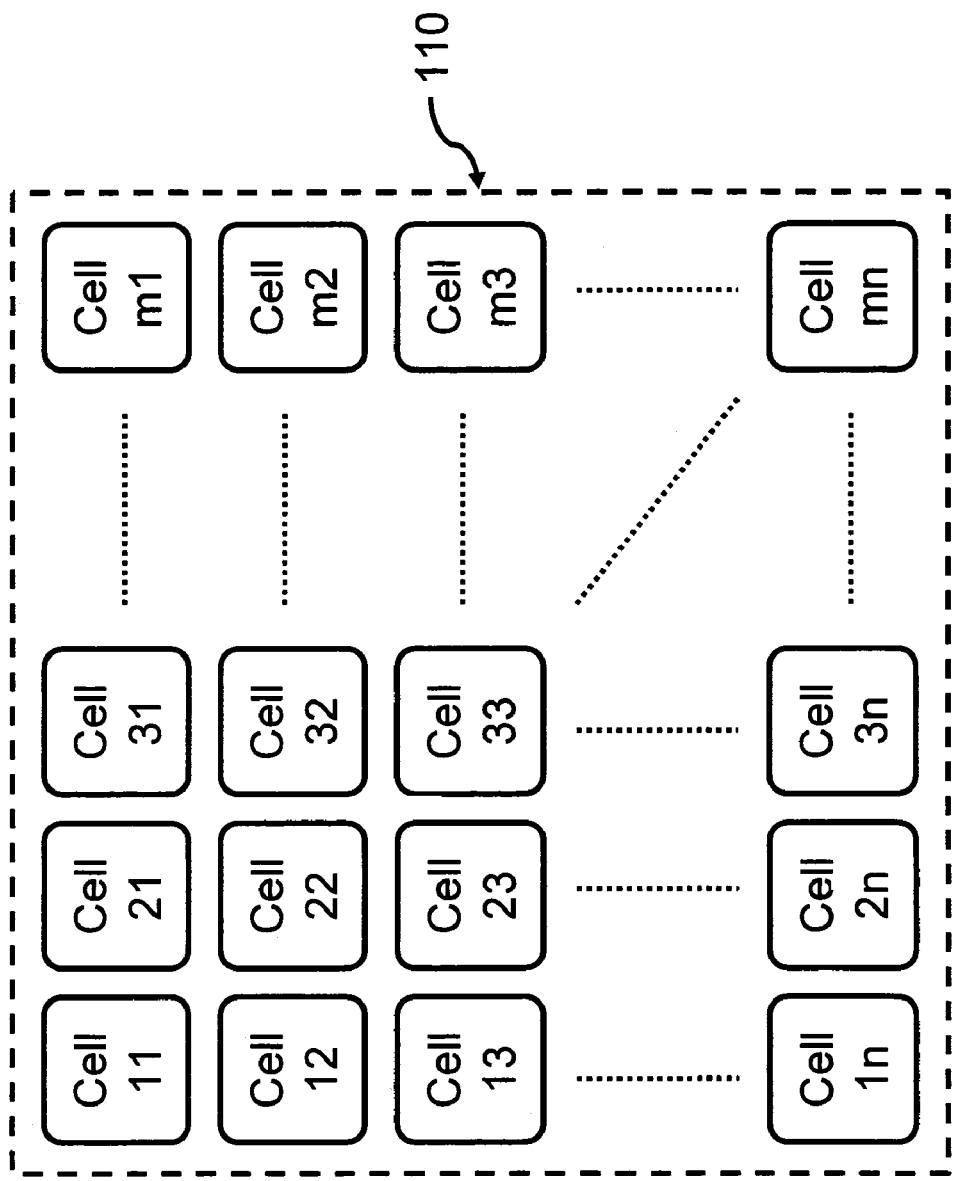
FIG. 2 is a schematic structural diagram of an embodiment of the set of matrix light-sensing cells in FIG. 1.
Figure 3:
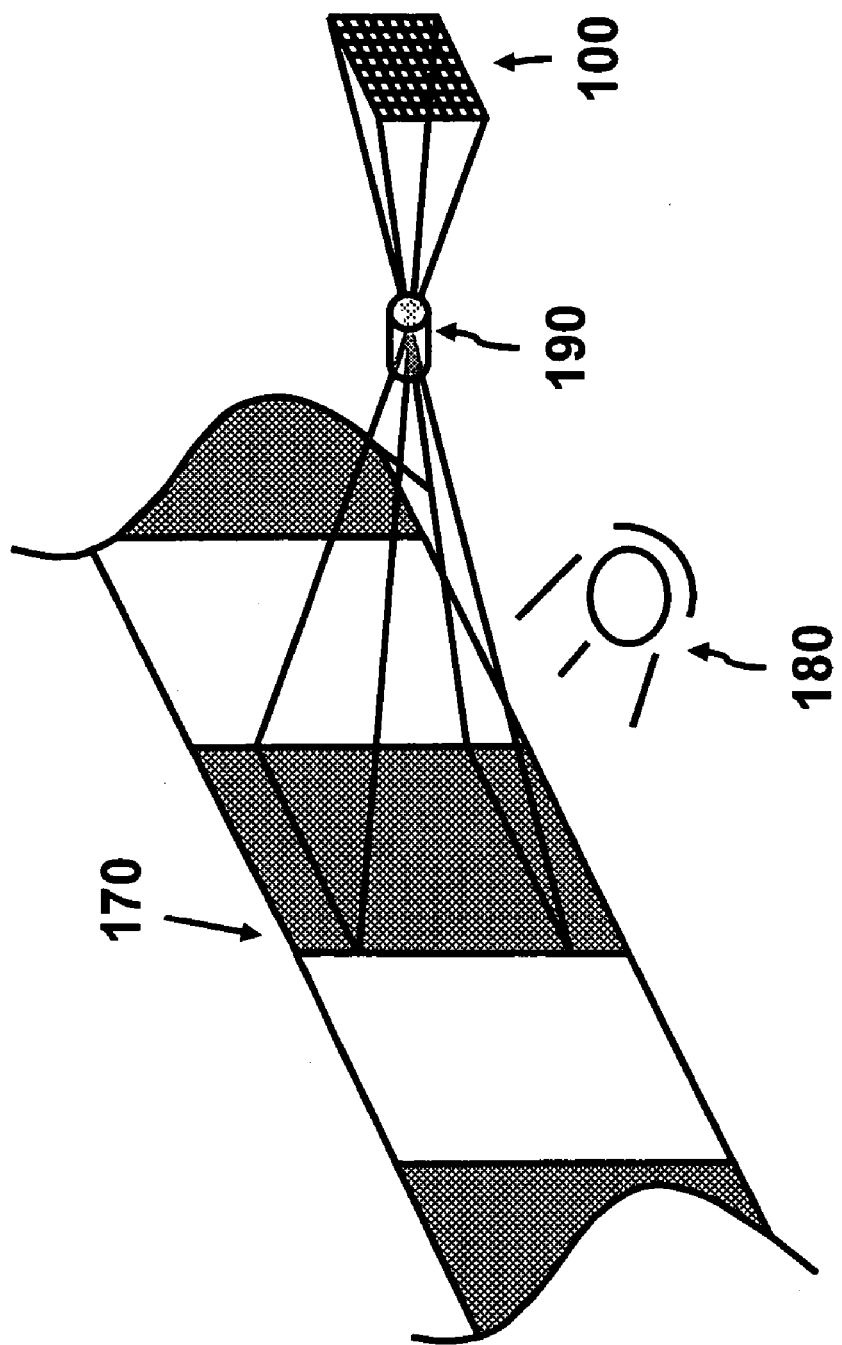
FIG. 3 is a schematic view showing how the embodiment of the set of matrix light-sensing cells shown in FIG. 2 is implemented.

The arrangement of the set of matrix light-sensing cells 110 is shown in FIG. 2. The set of matrix light-sensing cells is formed with the m-by-n light-sensing cells Cell 11 to Cell mn arranged in a matrix, where m and n are integers greater than 1. The set of matrix light-sensing cells is implemented with an optical scale 170, which mainly includes several reflective regions and several non-reflective regions. The sensed region of the optical scale 170 changes with the scanning location. The reflective regions on the optical scale 170 reflect the light from the light source 180. The reflective light is converged on the set of matrix light-sensing cells 110 by a lens set 190. According to the different arrangements of the reflective and non-reflective regions, the set of matrix light-sensing cells encodes the detected light to determine the corresponding scanning location, as shown in FIG. 3. The width of each of the light-sensing cells Cell 11 to Cell mn is increased to enlarge the light flux, thereby promoting the exposure process.

Figure 4:
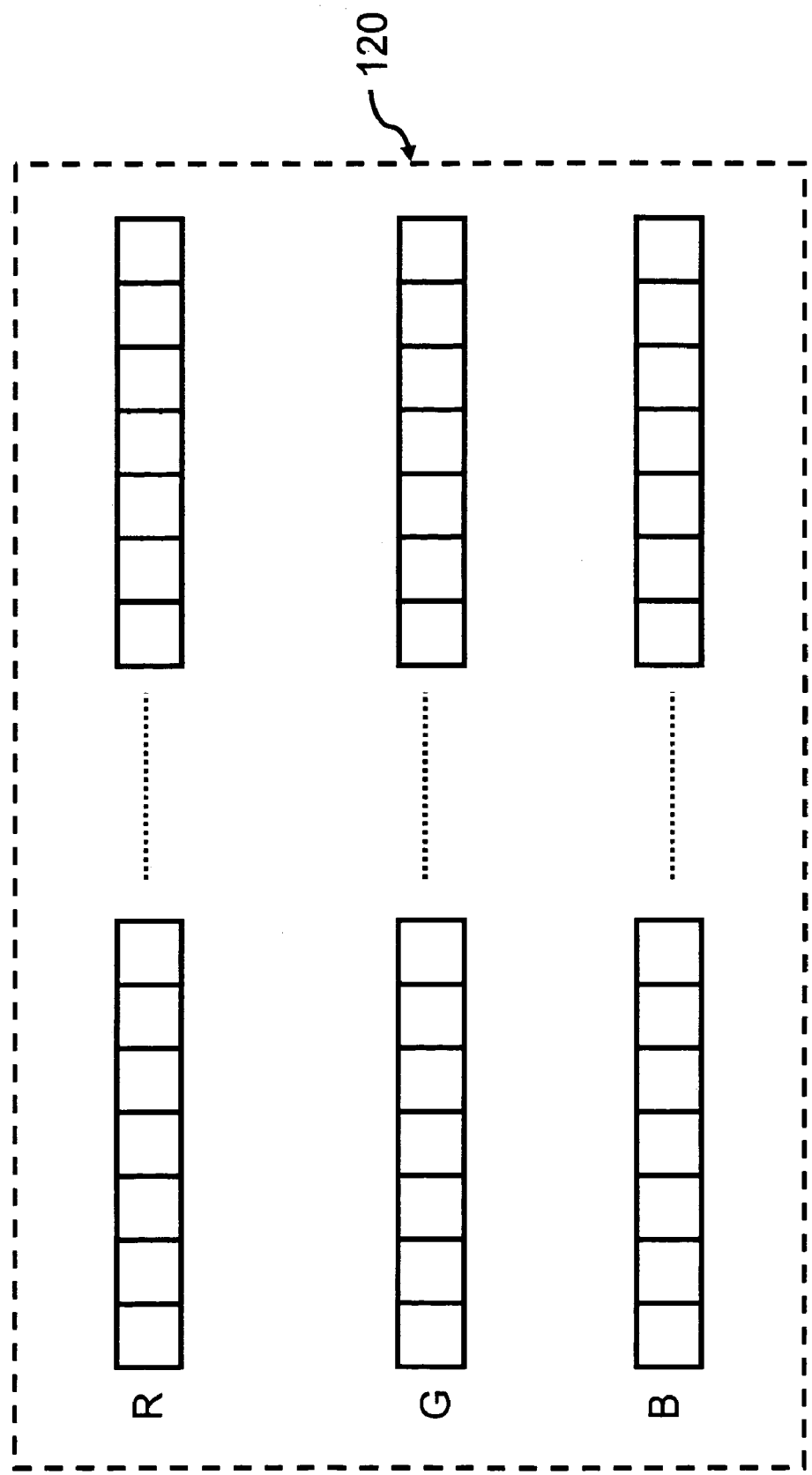
FIG. 4 is a schematic diagram of an embodiment of the set of trilinear light-sensing cells in FIG. 1.

The arrangement of the set of trilinear light-sensing cells 120 is shown in FIG. 4. The set of trilinear light-sensing cells comprises three linear arrays of the light-sensing cells. The linear arrays of the light-sensing cells respectively correspond to the color signals, i.e. the red color signal R, the green color signal G, and the blue color signal B.

For example, when scanning a document, the scanning device is set with a predetermined number of scanning pixels. The scanning speed and positioning are then adjusted according to the sensed signals representing the scanning location. The document is scanned gradually to obtain an image signal. That is, an image of the scanned document is outputted based on the predetermined pixels.

Figure 5:
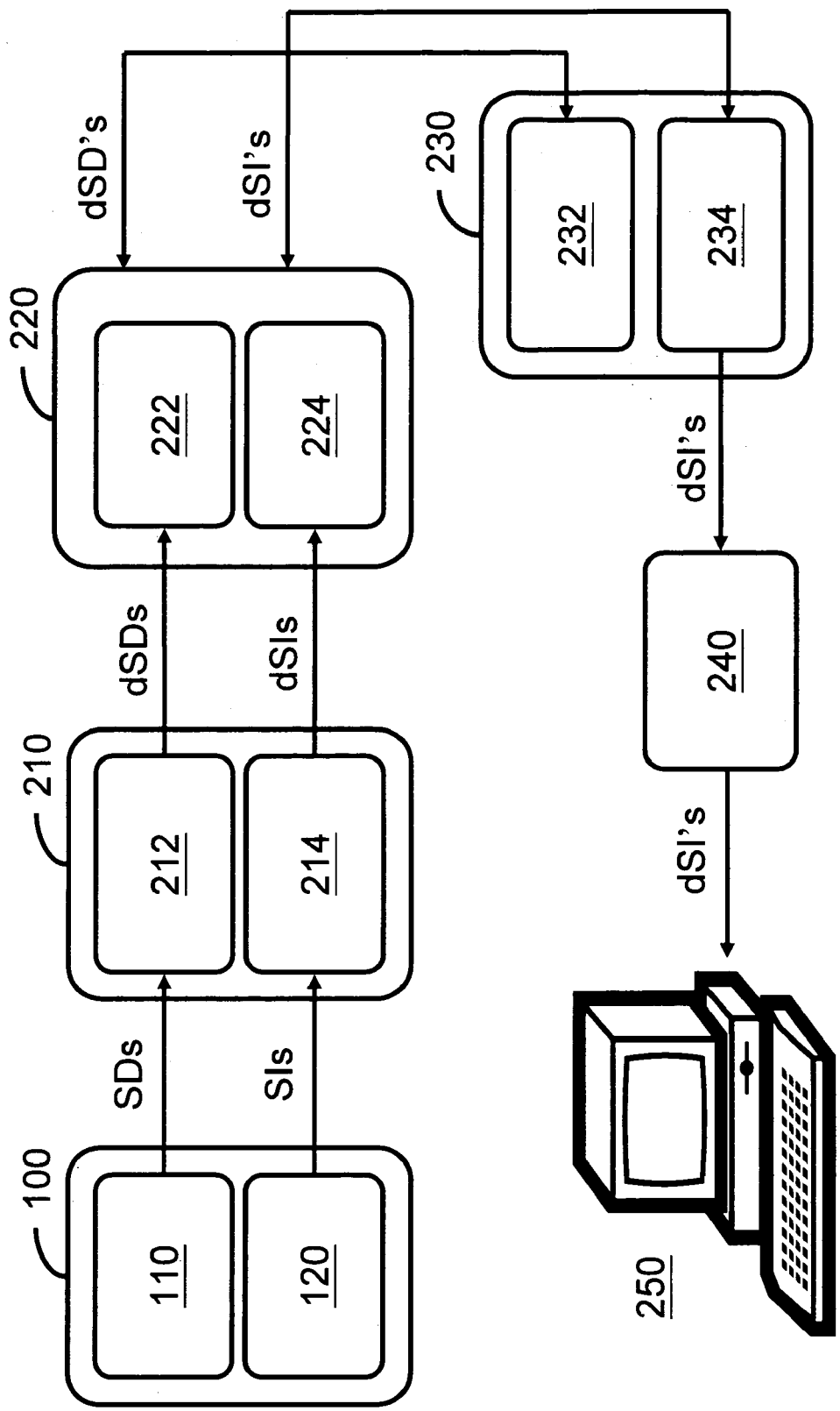
FIG. 5 is a schematic view of the high-speed image scanning system to which the light sensing element with two functions according to an embodiment of the invention is applied.

To show adequately the feasibility of the disclosed light sensing element with two functions, the operation is explained using an embodiment with reference to FIG. 5.

In this embodiment, the following things are assumed: an optical scale corresponding to the scanning location for the scanned document is provided; the light sensing element 100 with two functions comprises two sets of light-sensing cells, i.e. a set of matrix light-sensing cells 110 and a set of trilinear light-sensing cells 120, analog-to-digital converters (ADCs) 210 having two ADCs, i.e. the first ADC 212 and the second ADC 214, both which are controlled by a converter control unit, and a memory set 230 having two memories, i.e. the first memory 232 and the second memory 234, both which are controlled by a memory control unit.

First, through using the set of matrix light-sensing cells 110 in the light sensing element 100, receive reflective light from the corresponding sensing regions of the optical scale, and the set of trilinear light-sensing cells 120 simultaneously extracts the pixels in a sensing region from scanned document. Therefore, the reflective light from the sensing regions corresponding to the scanning location is processed by the set of matrix light-sensing cells 110, and then analog sensed signals SDs are outputted from the set of matrix light-sensing cells 110. The extracted pixels are processed by the set of trilinear light-sensing cells 120, and then analog image signals SIs are outputted from the set of trilinear light-sensing cells 120.

Under the control of the converter control unit, the analog sensed signals SDs outputted are received by the first ADC 212, and the analog image signals SIs outputted are received by the second ADC 214. The analog sensed and analog image signals SDs, SIs are converted by parallel processing into digital sensed and digital image signals dSDs, dSIs, and then the digital sensed and digital image signals dSDs, dSIs are outputted into an application specific processing unit 220. In this case, the first ADC 212 outputs the digital sensed signals dSDs and the second ADC 214 outputs the digital sensed signals dSIs. However, the invention also allows the converter control unit to process in a non-one-to-one method.

After the application specific processing unit 220 receives the digital signals, the signal process units 222 and image processing units 224 of the application specific processing unit 220 execute the signal processing and the image processing of the digital signals. Afterwards, the memory control unit controls the first memory 232 and the second memory 234 to store respectively the processed digital sensed signals dSD's and the processed digital image signals dSI's.

The application specific processing unit 220 retrieves the digital signals corresponding to the reflected light from the first memory 231, thereby determining the scanning location for the scanned document to adjust the scanning speed and positioning; and further, to detect the next sensing region for the scanned document. Finally, the application specific processing unit 220 retrieves the digital signals from the second memory 234 based on the digital signals corresponding to the reflected light, and performs the sorting of the complete output image signals. In the end, the overall image signals are outputted in the correct order into a processing terminal 250 via connection of an image output interface 240. Therefore, the process of high-speed image scanning is concluded.

Figure 6:
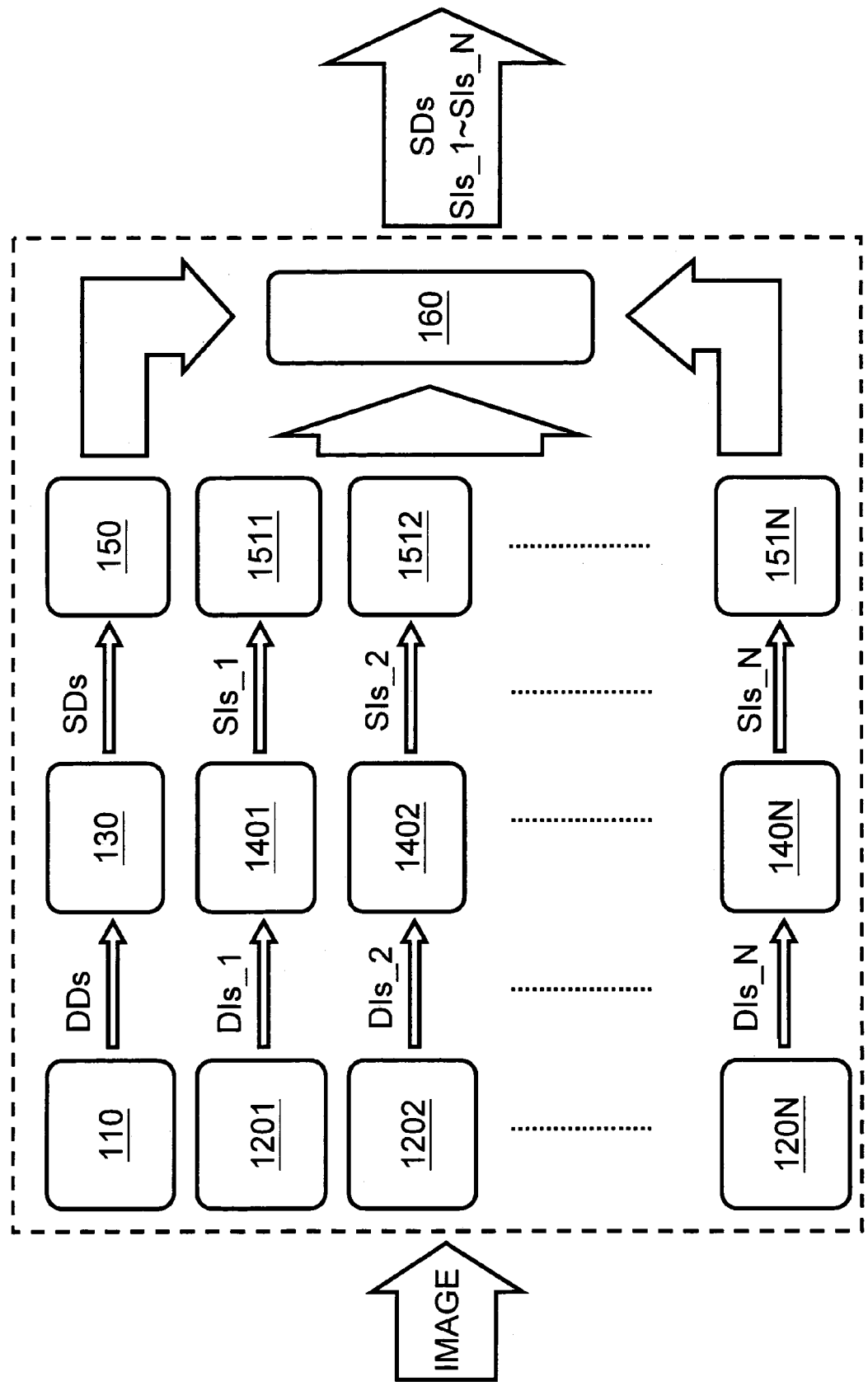
FIG. 6 is a schematic diagram of the light sensing element with two functions according to another embodiment of the invention.

Further, several sets of trilinear light-sensing cells 120 (e.g. the first set of trilinear light-sensing cells 1201, the second set of trilinear light-sensing cells 1202, . . . , and the Nth set of trilinear light-sensing cells 120N), several color signal processing units 140 (e.g. the color signal processing unit 1401, the color signal processing unit 1402, . . . , and the color signal processing unit 140N), and several second buffers 151 (e.g. the second buffer 1511, the second buffer 1512, . . . , and the second buffer 151N) are employed. The first to Nth sets of trilinear light-sensing cells 1201 to 120N detect collaterally several sensing regions and obtain several image signals SIs_1 to SIs_N in collateral process. Then, the image signals SIs_1 to SIs_N are stored respectively to the corresponding second buffers 2511 to 251N. The synchronization processing unit 160 synchronizes the image signals SIs_1 to SIs_N, and then outputs the synchronized image signals, as shown in FIG. 6. In particular, the control of the scanning speed and positioning is also executed according to the sensed signals SDs, thereby obtaining the image signals SIs_1 to SIs_N; and further, the image signals corresponding to the scanned document IMAGE are obtained according to the sensed signals SDs. That is, the scanning device is set to divide the document (i.e. the scanned document) into several sensing regions beforehand. When the scanning device scans step by step the document, each of the sets of trilinear light-sensing cells in the scanning device scans each of the sensing regions and generates the corresponding image data.

In particular, the set of matrix light-sensing cells and the set of trilinear light-sensing cells can be formed by the same light-sensing cells in different arrangements. In this case, the light-sensing cell is one in a contact image sensor (CIS), a charge-coupled-device (CCD), or a complementary metal oxide semiconductor (CMOS) image sensor.

Herein, the disclosed light sensing element with two functions has the signal control and image capture functions. It detects a scanning location for the document to feedback control the scanning location and scanning speed, and executes the captured image in collateral process to speed up the image processing. Therefore, the invention can have the advantage of accelerating the scanning speed.

Certain variations would be apparent to those skilled in the art, which variations are considered within the spirit and scope of the claimed invention.

What is claimed is:

1. A light sensing and processing apparatus for use in an image scanning device to scan a document, comprising:

a set of matrix light-sensing cells arranged in a matrix for detecting a scanning location of the scanned document and outputting detected data corresponding to the scanning location;

a set of trilinear light-sensing cells, each of which has a plurality of light-sensing cells arranged in a linear array, for detecting a sensing region of the scanning, and outputting image data corresponding to the sensing region;

a sensed signal processing unit, coupled to the set of matrix light-sensing cells, for processing the detected data from the set of matrix light-sensing cells and outputting corresponding sensed signals;

a color signal processing unit, coupled to the set of trilinear light-sensing cells, for processing the image data and outputting image signals corresponding to the image data, the image signals including red, green, and blue color signals;

a plurality of buffers, respectively installed with the sensed signal processing unit and the color signal processing unit, for storing respectively the sensed signals and the image signals; and a synchronization processing unit, connected to the buffers, for receiving the sensed signals and the image signals from the buffers and for adjusting the image signals according to the corresponding sensed signals;

wherein the scanning location is adjusted based on the sensed signals to acquire the image data.

2. The apparatus of claim 1, wherein the light-sensing cells in the set of matrix light-sensing cells are arranged in an m×n matrix, wherein m and n are integers greater than 1.

3. The apparatus of claim 2, wherein the width of the light-sensing cells in the set of matrix light-sensing cells is increased to speed up a speed finding the scanning location.

4. The apparatus of claim 1, wherein the set of trilinear light-sensing cells has three linear arrays of light-sensing cells, each of which corresponds to one of the color signals.

5. The apparatus of claim 1, wherein the set of matrix light-sensing cells and the set of trilinear light-sensing cells are a plurality of portions of light-sensing cells, into which light-sensing cells in a contact image sensor (CIS) are divided.

6. The apparatus of claim 1, wherein the set of matrix light-sensing cells and the set of trilinear light-sensing cells are a plurality of portions of light-sensing cells, into which light-sensing cells in a charge-coupled-device (CCD) are divided.

7. The apparatus of claim 1, wherein the set of matrix light-sensing cells and the set of trilinear light-sensing cells are a plurality of portions of light-sensing cells, into which light-sensing cells in a complementary metal oxide semiconductor (CMOS) image sensor are divided.

8. The apparatus of claim 1, further comprising at least one additional set of trilinear light-sensing cells.

9. The apparatus of claim 8, further comprising at least one additional color signal processing unit, each at least one additional color signal processing unit being coupled to a respective one of the at least one additional set of trilinear light-sensing cells.

10. The apparatus of claim 1, wherein the set of trilinear light-sensing cells scans the document and the set of matrix light-sensing cells scans an optical scale in the image scanning device.

* * * * *